US006961683B2

(12) United States Patent
Kodama et al.

(10) Patent No.: US 6,961,683 B2
(45) Date of Patent: Nov. 1, 2005

(54) INTERFACE MEMBER WIRING DESIGN SUPPORT APPARATUS, WIRING DESIGN METHOD, WIRING DESIGN SUPPORT METHOD, AND COMPUTER-READABLE STORAGE MEDIUM

(75) Inventors: Nobuhiro Kodama, Hiroshima-ken (JP); Takashi Yoshiyuki, Hiroshima-ken (JP); Seiichi Hirano, Hiroshima-ken (JP); Tomohiro Fukushima, Hiroshima-ken (JP)

(73) Assignee: Mazda Motor Corporation, Hiroshima (JP)

( * ) Notice: Subject to any disclaimer, the term of this patent is extended or adjusted under 35 U.S.C. 154(b) by 985 days.

(21) Appl. No.: 09/781,323

(22) Filed: Feb. 13, 2001

(65) Prior Publication Data

US 2001/0020223 A1 Sep. 6, 2001

(30) Foreign Application Priority Data

Mar. 2, 2000 (JP) ........................................ 2000-057553

(51) Int. Cl.[7] ........................... G06F 17/10; G06F 17/50
(52) U.S. Cl. ............................................. 703/2; 703/1
(58) Field of Search ........................ 703/1, 2; 174/135; 264/40.7; 439/217

(56) References Cited

U.S. PATENT DOCUMENTS

| | | | | | |
|---|---|---|---|---|---|
| 5,352,855 | A | * | 10/1994 | Potter | 174/135 |
| 5,573,716 | A | * | 11/1996 | Jacobson | 264/40.7 |
| 6,087,593 | A | * | 7/2000 | Skipworth et al. | 174/135 |
| 6,089,892 | A | * | 7/2000 | Snow et al. | 439/217 |

FOREIGN PATENT DOCUMENTS

JP 07-182017 7/1995

OTHER PUBLICATIONS

Minquan et al., New Concept of Vehicle Intelligent Harness System Design, IEEE, Vehicle Electronics Conference, Sep. 1999, pp. 451–454.*
Aguirre et al., Performances of Wire Harness Assembly Systems, 1994 IEEE Int. Symposium on Industrial Electronics, May 1994, pp. 292–297.*
Billsdon et al., Wiring Harness Design: Can a Computer Help?, Computing & Control Engineering Journal, vol. 9, No. 4, Aug. 1998, pp. 163–168.*
Smith et al., Crosstalk Modeling for Automotive Harnesses, IEEE Int. Symposium on Electromagnetic Compatibility, Aug. 1994, pp. 447–452.*
Kelley et al., Coordinated Interconnect: A Philosophical Change in the Design and Construction of Power Electric Converters, IEEE, Industry Applications Conference, vol. 2, Oct. 1998, pp. 1105–1110.*
Alibozek, Tim; "Smart Software Builds a Better Harness"; *Machine Design Penton Publ Inc.*; vol. 70, No. 8; May 1998.

* cited by examiner

*Primary Examiner*—Russell Frejd

(57) ABSTRACT

Flexural rigidity E of a target wire harness (to be referred to as a WH hereinafter) is calculated by a predetermined bi-quadratic function associated with a curvature $\rho$ on the basis of a diameter $\phi$ of the WH, and the wiring shape of the WH which satisfy fixing positions is calculated on the basis of torsional rigidity C and the weight per unit length which are supplied from a storage device in accordance with the diameter $\phi$ of the target WH (S4–S5). The bi-quadratic function is set such that the calculated flexural rigidity E decreases as the curvature $\rho$ of the WH increases.

40 Claims, 15 Drawing Sheets

FIG. 4

| FIXING METHOD | MOVEMENT DUE TO RESULTANT FORCE | | | ROTATION DUE TO RESULTANT MOMENT | | |
|---|---|---|---|---|---|---|
| | x DIRECTION | y DIRECTION | z DIRECTION | x DIRECTION | y DIRECTION | z DIRECTION |
| CONNECTOR | × | × | × | × | × | × |
| STATIONARY CLIP | × | × | × | × | × | × |
| ROTATING CLIP | × | × | × | ○ | ○ | × |
| BRANCH POINT (FREE END) | ○ | ○ | ○ | ○ | ○ | ○ |

( × : IMPOSSIBLE
○ : POSSIBLE )

US 6,961,683 B2

INTERFACE MEMBER WIRING DESIGN SUPPORT APPARATUS, WIRING DESIGN METHOD, WIRING DESIGN SUPPORT METHOD, AND COMPUTER-READABLE STORAGE MEDIUM

FIELD OF THE INVENTION

The present invention relates to an interface member wiring design support apparatus and wiring design method and, more particularly, to a support apparatus and wiring design method for supporting optimal wiring design for various types of wire harnesses at the site of design of an automobile or the like.

BACKGROUND OF THE INVENTION

Interface members for connecting a given electrical component to another electrical component or a given package to another package are used in a vehicle such as an automobile or an electronic device such as a household electrical appliance.

As a typical interface member, a so-called wire harness is available, which is formed by binding a plurality of electric wires or communication lines into a bundle by using a protective member such as a tape as needed and attaching predetermined connectors to the two end portions of the bundle. Wire harnesses differ in the numbers of electric wires and the thickness of each electric wire, and some wire harnesses have branch points while others do not have any wire harnesses in accordance with application purposes (connection destinations). Therefore, the wire harnesses vary in rigidity.

At the maker site of design frequently using such wire harnesses, CAD (Computer-Aided Design) systems have been widely used for design of electrical components, packages, and the like at an earlier time. In general, however, for design of wire harness wiring routes, lengths, the number of electric wires or communication lines to be bound into a bundle, and the like, a designer repeatedly forms prototypes mainly on the basis of intuition and experiences.

Recently, however, to develop a product in a short period of time with the minimum number of prototypes actually formed, a series of design operations have been performed on a design support apparatus using a computer and the like. In designing the above wire harness, demand has arisen for a support apparatus which can facilitate optimal design regardless of designer's experience.

With such need as a background, in current CAD systems, a function has been developed, which automatically calculates a curve or curved surface that satisfies (approximates) a plurality of points (coordinates) defined on a two-dimensional plane or three-dimensional space by an operator by using a parametric technique using a B-Spline curve, Bezier curve, NURBS curved surface, or the like.

Shape simulations based on these methods satisfy the coordinate data of a plurality of fixed points. However, these simulations are performed by geometric processing. If, therefore, such a simulation is applied to, for example, the design of wire harness wiring, since no consideration is given to the weight and hardness (rigidity) of the wire harness and dynamic factors such as force produced at fixed positions such as connectors due to these factors, it is often difficult (impractical) to directly manufacture an actual product in accordance with the generated shape.

As one of the parametric techniques described above, a method of performing a simulation of the shape of a wire harness disposed along an arm of an industrial robot is disclosed in Japanese Patent Laid-Open No. 7-182017.

In this method, the shape of a wire harness as a simulation target which deforms as an arm of a robot moves is automatically calculated on the basis of parameters, input by an operator, such as a plurality of fixed point positions on the arm, tangent vectors at the fixed position positions, the length of the wire harness, and the modulus of deformation. This makes it possible to check interference between the arm and surrounding apparatuses.

In the prior art described above, however, no consideration is given to semifixed support members (clips) for fixing the wire harness, branch portions provided for the same wire harness, forces that are produced at the respective fixed points as the wire harness bends, and the like.

In addition, in the automatically calculated shape of a wire harness, the forces acting on connectors and the like on the two end portions of the wire harness are not clarified, it is difficult to grasp, for example, how much strength is necessary or appropriate in fixing the wire harness.

SUMMARY OF THE INVENTION

It is an object of the present invention to provide an interface member wiring design support apparatus, wiring design method, wiring design support method, and computer-readable storage device, which calculate a more practical shape with simple set items and inform the calculated shape.

In order to achieve the above object, an interface member wiring design support apparatus according to the present invention is characterized by having the following arrangements.

There is provided an interface member wiring design support apparatus comprising arithmetic means for calculating an interface member wiring shape on the basis of a plurality of input fixing positions and a modulus of deformation of an interface member so as to satisfy the fixing positions, and informing the calculated shape, characterized in that the arithmetic means (arithmetic control unit) 21 calculates flexural rigidity E of a target interface member by a predetermined bi-quadratic function associated with a curvature $\rho$ of the interface member on the basis of an input interface member diameter $\phi$, and calculates a wiring shape of the interface member by using the calculated flexural rigidity E.

According to this interface member wiring design support apparatus, since the shape of the interface member is calculated in consideration of the flexural rigidity E, a shape that is more practical and feasible (manufacturable) can be calculated.

In addition, in calculating the flexural rigidity E, the arithmetic means may use the maximum curvature of the target interface member as the curvature $\rho$. This makes it possible to perform efficient calculation.

For example, the wiring design support apparatus may further comprise storage means (storage unit) 26 in which as moduli of a plurality of types of interface members which can be selected as design targets, a relationship between diameters $\phi$ of the interface members, torsional rigidities C of the interface members, and weights of the interface members per unit length is stored in advance, and the arithmetic means may calculate a wiring shape of the target interface member by the Konapasek's mathematical expressions on the basis of the flexural rigidity E calculated by the predetermined bi-quadratic function and the torsional rigidity C and weight per unit length supplied from the storage means in accordance with the diameter ϕ of the target interface member. This makes it possible to calculate a shape on which dynamic factors produced when the interface member is twisted are accurately reflected, with a relatively small calculation amount, in consideration given to the weight of the real interface member.

According to the preferred embodiment, the arithmetic means, when calculating a wiring shape of a target interface member, may calculate forces acting at the plurality of fixing positions due to the interface member, and inform information (the magnitudes and directions of the forces) associated with the calculated forces. With this operation, since the states of forces acting at the fixing positions are informed in the form of the magnitudes and directions of the forces, optimal design can be performed in consideration of the states of the forces.

According to the preferred embodiment, the arithmetic means calculates a wiring shape of an interface member on the basis of a plurality of input fixing positions, fixing directions at the fixing positions, and a modulus of deformation of the interface member so as to satisfy the fixing positions, the arithmetic means may include designation means (22, 23) capable of designating whether the target interface member can rotate in a normal direction at least at one fixing position of the target interface member, and when at least one fixing position is designated by the designation means as a position at which the interface member can rotate, the arithmetic means may calculate a shape of the interface member, and calculates a force that causes the interface member to rotate in the normal direction at the designated fixing position. This makes it possible to accurately calculate a force that is produced at a fixing position at which the interface member can rotate and causes the interface member to rotate.

According to the preferred embodiment, the arithmetic means calculates an interface member wiring shape satisfying at least three fixing positions on the basis of the fixing positions, fixing directions at the fixing positions, and a modulus of deformation of the interface member and informs the calculated shape, and when the target interface member includes a branch point, the arithmetic means may calculate an interface member shape including the branch point, and a dynamically balancing position at which the branch point is to be located owing to the shape. This makes it possible to accurately calculate the balanced shape of the interface member including a movable branch portion.

In order to achieve the above object, an interface member wiring design method according to the present invention is characterized by having the following arrangements.

There is provided an interface member wiring design method of calculating an interface member wiring shape on the basis of a plurality of fixing positions and a modulus of deformation of an interface member so as to satisfy the fixing positions, characterized by comprising a step of calculating flexural rigidity E of a target interface member by a predetermined bi-quadratic function associated with a curvature ρ of the interface member on the basis of an input interface member diameter ϕ, and calculating a wiring shape of the interface member by using the calculated flexural rigidity E.

According to this interface member wiring design method, since the shape of the interface member is calculated in consideration of the flexural rigidity E, a shape that is more practical and feasible (manufacturable) can be calculated.

In each of the interface member wiring design support apparatus and method describe above, the predetermined bi-quadratic function is flexural rigidity $E=f(\phi, \rho)=G(a_0(\phi)+a_1(\phi)\rho+a_2(\phi)\rho^2) \times K$ where $a_0(\phi)$, $a_1(\phi)$, and $a_2(\phi)$ are predetermined constants corresponding to the interface member diameter ϕ, G is a gravitational acceleration, and K is a constant determined in accordance with a type of protective member. In this case, the calculated flexural rigidity E may be set such that the calculated flexural rigidity E decreases as the curvature ρ increases. This makes it possible to calculate a shape on which dynamic factors produced when the interface member is twisted are accurately reflected, with a relatively small calculation amount.

In calculating the wiring shape of the target interface member by using the calculated flexural rigidity E, as moduli of a plurality of types of interface members which can be selected as design targets, a relationship between diameters ϕ of the interface members, torsional rigidities C of the interface members, and weights of the interface members per unit length may be specified in advance, and a wiring shape of the target interface member may be calculated on the basis of the flexural rigidity E calculated by the predetermined bi-quadratic function and the torsional rigidity C and weight per unit length supplied from the storage step in accordance with the diameter ϕ of the target interface member. This makes it possible to calculate a shape on which dynamic factors produced when the interface member is twisted are accurately reflected, with a relatively small calculation amount, in consideration given to the weight of the real interface member.

In addition, there is provided a computer-readable storage medium characterized by storing a program code which causes a computer to implement the interface member wiring design support apparatus and wiring design method, wiring design support method described above.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 4 is a view showing a list of the types of support members and their degrees of freedom, which are used in shape calculation for the wire harness according to this embodiment;

DETAILED DESCRIPTION OF THE PREFERRED EMBODIMENT

An interface member wiring design support apparatus and wiring design method according to the present invention will be described in detail below with reference to the accompanying drawings as an embodiment in which the present invention is applied to the wiring design of a wire harness formed by binding a plurality of electric wires into a bundle and attaching a predetermined connector to each end portion of the bundle.

Note, in the present invention, the interface member (in other words, a line member or a line object) includes not only the wire harness but also various kinds of cables such as an optical cable and electrical cable, and pipe for carrying fluid.

Figure 1:
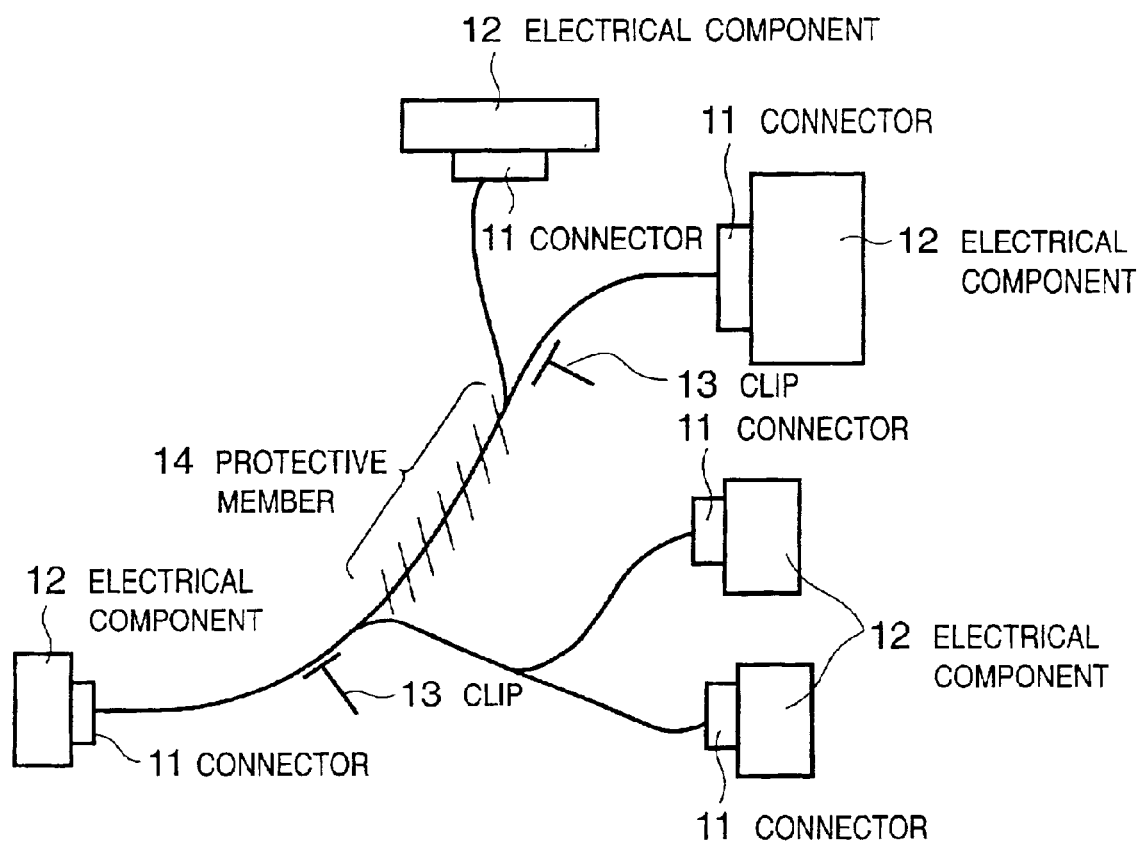
FIG. 1 is a view showing an example of the overall shape of a wire harness as a design target in an embodiment of the present invention.
Figure 2:
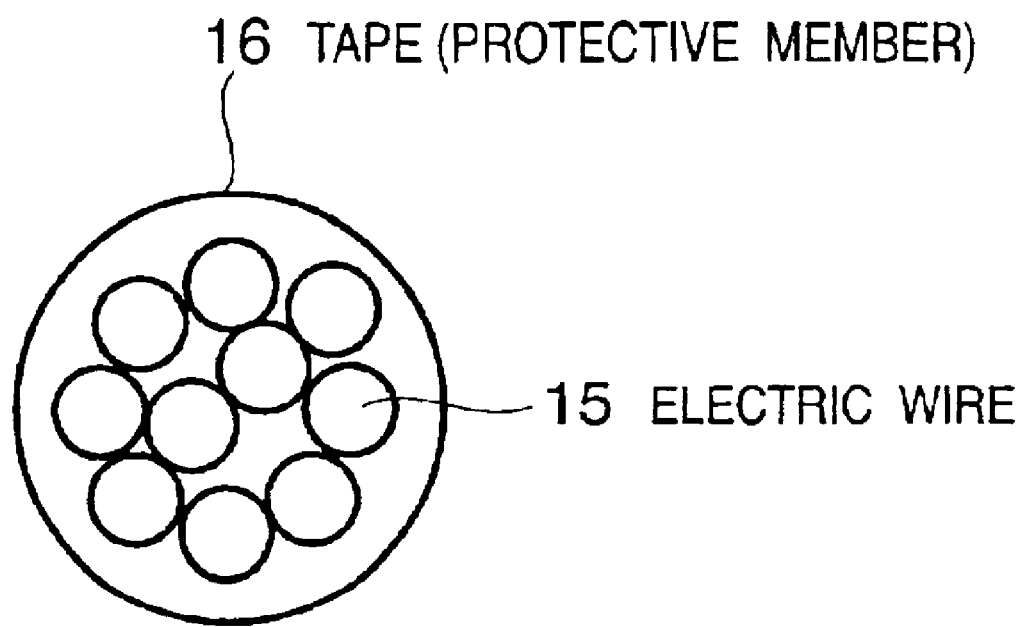
FIG. 2 is a view showing an example of a cross-sectional shape of the wire harness in FIG. 1.

FIG. 1 is a view showing an example of the overall shape of a wire harness as a design target in this embodiment. FIG. 2 is a view showing an example of the sectional shape of the wire harness in FIG. 1.

The wire harness shown in FIG. 1 has connectors 11 at the respective end portions, which are connected to electrical components 12, and three branch portions (branch points).

As shown in FIG. 2, in a cross-section of an interface member portion of this wire harness, a plurality of electric wires 15 are bound into a bundle with a protective member such as a tape 16, a binding member made of a synthetic resin (not shown) (for example, a coiled coil or insulock (binder), and the like. In the wire harness shown in FIG. 1, basically, the number of electric wires bundled together increases toward the left side in FIG. 1 and decreases toward the right side across each branch portion.

The middle portion of the wire harness is protected by a protective member 14 having higher strength than other portions to prevent the electric wires 15 and the conductors (not shown) located therein from being exposed due to contact (friction) with external interfering objects.

In the wire harness shown in FIG. 1, each connector 11 is detachably fixed to a predetermined fixing position in accordance with the fixing position of a connector (not shown) as a counterpart provided on the corresponding electrical component 12 and its mounting direction. Clips 13 in FIG. 1 are attached to the predetermined positions of surrounding interfering objects (e.g., the inner surface of a product housing and stay) and serve as support members for holding the wire harness at the predetermined positions in a fixed or semi-fixed state (rotatable around an axis).

The respective branch points on the wire harness are arranged at positions where dynamic balance can be maintained in accordance with the rigidity of each portion, the fixing position of each connector 11, the fixing position of each clip 13, its supporting method, and the like.

Figure 3A:
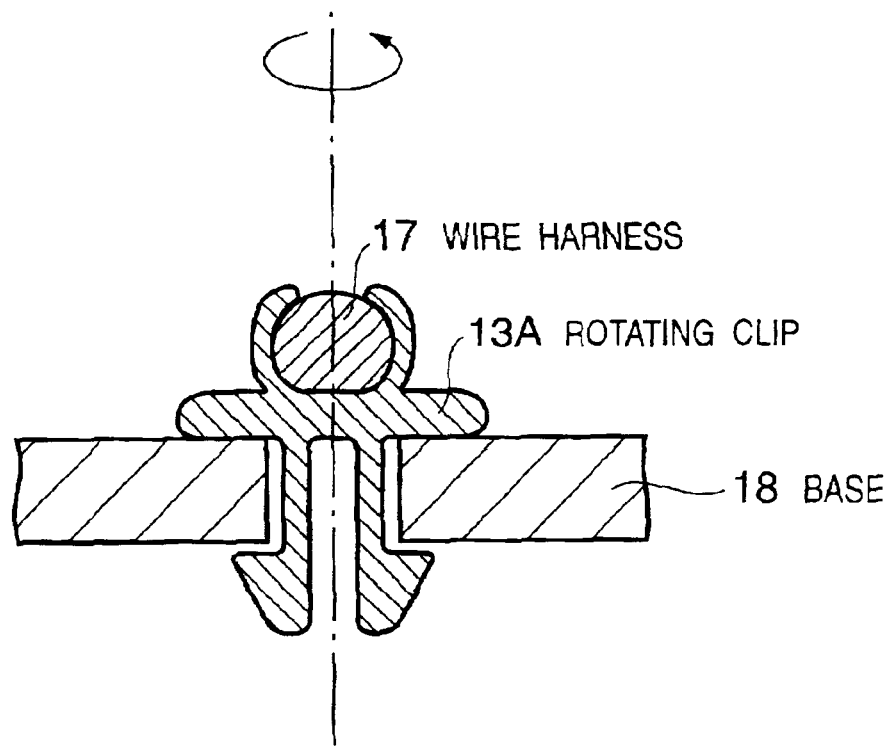
FIGS. 3A and 3B are views showing an example of the shape of a rotating clip holding the target wire harness in this embodiment.
Figure 3B:
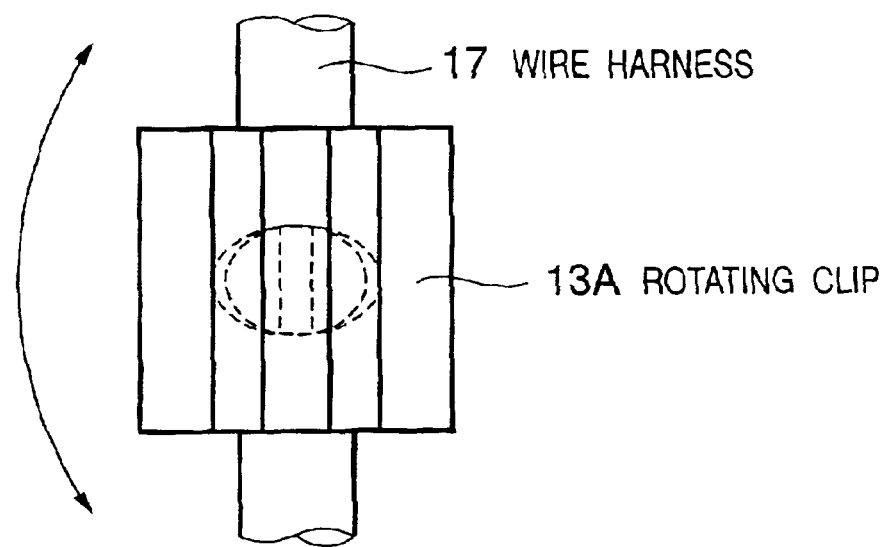

FIGS. 3A and 3B are views showing an example of the shape of a rotating clip for holding the wire harness as the design target in this embodiment.

FIG. 3A is a sectional view of a rotating clip 13A as an example of the clip 13. FIG. 3B is a plan view of the rotating clip 13A. The rotating clip 13A is a resin clip having two support legs each having a semicircular cross-section and a pedestal formed on its upper portion, on which a wire harness 17 can be held. The two support legs of the rotating clip 13A are inserted into a circular mount hole formed in a base 18 so as to be rotatable around an axis extending through the center of the circle. In this embodiment, a rotatable support member like the rotating clip 13A will be generically referred to as a rotating clip hereinafter.

As a clip for fixing the wire harness at a predetermined position without rotating, a stationary clip (not shown) can be realized by forming, for example, a rectangular mount hole in the base 18 and forming the two support legs of the rotating clip 13A in FIGS. 3A and 3B to have rectangular cross-sections in agreement with the size of the rectangular mount hole. Such clips will be generically referred to as stationary clips hereinafter.

Support members for supporting the wire harness and the degrees of freedom set when the wire harness is fixed with these support members will be summarized.

FIG. 4 is a view showing a list of the types of support members and the corresponding degrees of freedom which are handled when the shape of the wire harness according to this embodiment is calculated.

A column in FIG. 4 indicates, as wire harness fixing methods, methods using the above connector, stationary clip, and rotating clip, together with a branch point (free end) as a reference which is irrelevant to a fixing method in the strict sense.

Each row in FIG. 4 indicates, if a resultant force exists at the position where the wire harness is fixed with a corresponding support member, whether the fixing position can move at three-dimensional coordinates x, y, and z in accordance with the resultant force, and also indicates, if a resultant moment (composite moment) exists at the fixing position, whether the fixing position can rotate in a direction corresponding to the resultant moment.

As is obvious from FIG. 4, the wire harness cannot move and rotate in any directions (0 degree of freedom) at the fixing positions with the connector and stationary clip. In contrast to this, at the fixing position with the rotating clip, the wire harness can rotate in accordance with the resultant moment (2 degrees of freedom). At the branch point, the wire harness can move and rotate in all directions (6 degrees of freedom).

In this embodiment, it is an object to optimally wire the wire harness having the above branch portions by using these rotating and stationary clips. An outline of this embodiment will be described below.

In simulating the shape of a wire harness which satisfies the coordinates of fixing points of connectors, stationary clips, and the like which are input by the operator, the interface member wiring design support apparatus according to this embodiment calculates a flexural rigidity E of the wire harness, when it is bent, on the basis of the diameter of the wire harness or the like, and calculates forces F and moments M produced in portions of the wire harness on the basis of the flexural rigidity E and torsional rigidity C, thereby calculating the shape of the wire harness by using these calculated values. This makes it possible to implement more practical simulation calculation with consideration given to geometric and dynamic factors, unlike the prior art which performs simulation calculation for a wire harness by using only geometric factors.

<Mathematical Expressions Associated with Elastic Body Model>

In this embodiment, the elastic body model vector expressions provided by Konapasek are used to calculate the forces F and moments E, produced in portions when a wire harness having thickness and elasticity bends, and the shape of the wire harness. These vector expressions are described in detail in the reference (fiber Sci & Technology, 5, 1, 1972) by M. Konapasek and J. W. S Hearl. These mathematical expressions will be briefly described below with reference to FIG. 5.

Figure 5:
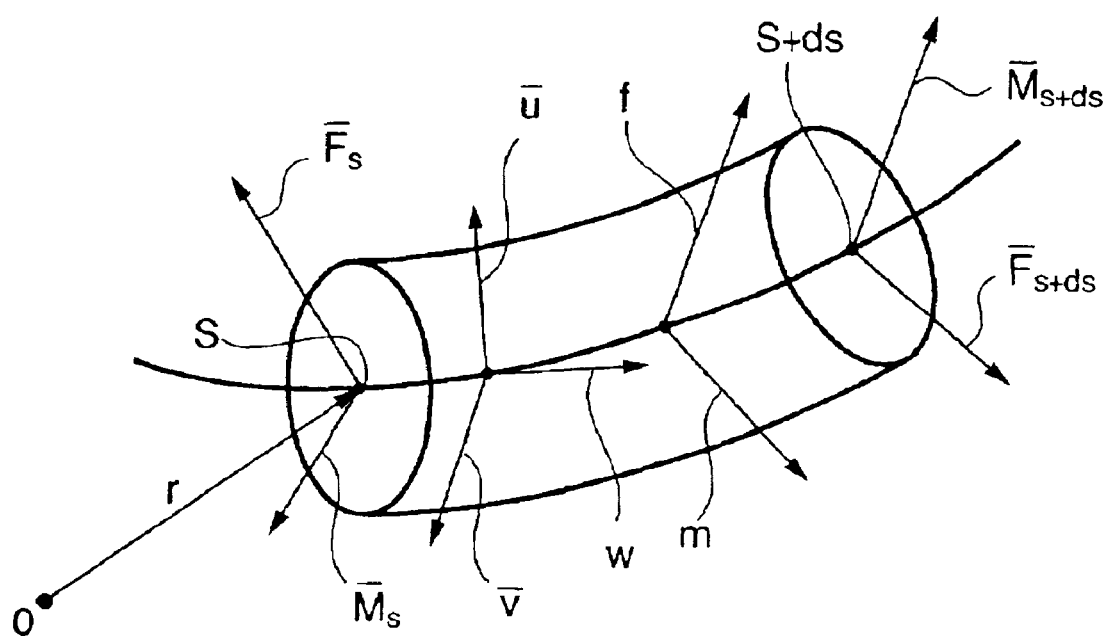
FIG. 5 is a view for explaining vector expressions of an elastic body model used in this embodiment.

FIG. 5 is a view for explaining the vector expressions of the elastic body model used in this embodiment.

Konapasek et al. have proposed, in the above reference, a technique of calculating the large deformation of a thin rod as an elastic body in a small calculation amount by a technique of approximating the thin rod without considering its diameter together with a geometric shape analysis technique so as to calculate the forces F and moments E in the elastic body having thickness and elasticity and its shape.

In this technique, the shape to which the thin rod should conform can be expressed by the following mathematical expressions in consideration of small intervals. Note that in the following description, each vector is expressed in bold type in this embodiment and with an overline in the accompanying drawings.

A mathematical expression associated with a position on the center line of the thin rod and the tangential direction at the position:

$$w = r/ds(r') \quad (1)$$

where r is a position from a predetermined reference point O on the center line of the thin rod, s is the distance (length) measured from the start point of the thin rod along the center line, and w is the tangential direction that indicates the direction of the thin rod at the position. In the following description, a slight change (differential) d/ds in s is represented by "'".

Mathematical expressions associated with a curvature p and a direction change amount:

$$u' = \omega \times u, \ v' = \omega \times v, \ w' = \omega \times w, \ \omega = pu + qv + rw \quad (2)$$

where p is the curvature in the u direction, q is the curvature in the v direction, r is the torsion around w, and u and v are coordinate system vectors combined with w.

Mathematical expressions associated with the curvature p and a moment:

$$M_u = A \cdot p, \ M_v = B \cdot q, \ M_w = C \cdot r \quad (3)$$

where A and B are flexural rigidities, C is a torsional rigidity, and $M_u$, $M_v$, and $M_w$ are components of a moment M in the u, v, and w directions.

Mathematical expressions associated with the balance between a force F and the moment M:

$$M_{(d+ds)} - M_s + mds + \{w \times F\} ds = 0$$

$$F_{(d+ds)} - F_s + fds = 0 \quad (4)$$

where m is a self-moment, F is a force acting on the distance s from the start point of the thin rod, and f is the weight of the thin rod.

The shape of the center line of the thin rod, force F, and moment M can be calculated by performing numerical analysis upon giving the positions and tangential directions of the two end points of the thin rod as boundary conditions to the respective mathematical expressions given above.

Values to be substituted into the above Konapasek's mathematical expressions to calculate the shape of the wire harness will be described next.

<Mathematical Expressions Associated with Flexural Rigidity E>

When the respective mathematical expressions associated with the elastic body model are applied to the wiring design of the wire harness shown in FIG. 1, since the wire harness as the design target varies in thickness depending on portions, the flexural rigidity E also varies. For this reason, this embodiment uses predetermined bi-quadratic functions associated with the curvature ρ given below in using the above mathematical expressions of the elastic body model described above for the calculation of the shape of the wire harness.

$$\text{Flexural rigidity } E \ (N \cdot cm^2) = f(\phi, \rho) = G(a_0(\phi) + a_1(\phi) \ \rho + a_2(\phi) \ \rho^2) \times K \quad (5)$$

In the bi-quadratic function of mathematical expression (5), $$a_0(\phi) = 5.76\phi + 1.04\phi^2,$$

$$a_1(\phi) = -0.28\phi - 0.0559\phi^2,$$

$$a_2(\phi) = 0.0047\phi + 0.000638\phi^2$$

The respective coefficients are values empirically obtained on the basis of experiments. φ represents the diameter (mm) of the wire harness; and ρ, curvature $(1/mm) \times 10^3$. These values are set in accordance with the shape of the wire harness in the longitudinal direction such that the two end portions of the wire harness satisfy the two set fixing positions (coordinate values). G represents a gravitational acceleration ($\approx 9.8$) $(m/sec^2)$; and K, a coefficient ($\leq 1.0$) determined in accordance with the type of a protective member.

In the mathematical expression of the flexural rigidity E, expressions $a_0(\phi)$ to $a_2(\phi)$ are empirically obtained on the basis of experiments conducted by the present applicant on a plurality of wire harnesses which differ in thickness, the numbers of electric wires, the presence/absence of protective members, and the like. The value of the flexural rigidity E calculated by the bi-quadratic function of mathematical expression (5) decreases as the curvature ρ of the target wire harness increases.

In this embodiment, the flexural rigidity E calculated by mathematical expression (5) is commonly used as the flexural rigidity values A and B contained in mathematical expression (3).

The reason for this operation will be described below. The reason why the flexural rigidity values A and B contained in mathematical expression (3) is that embodiment (3) is established with consideration given to the directional properties of flexuousness of the elastic body model (for example, a material having an elliptic cross-section is hard in the major axis direction but soft in the minor axis direction). If a wire harness which can be basically regarded to be almost constant in flexural rigidity and torsional rigidity as long as the number of electric wires internally bound remains the same as in this embodiment, the directional properties of flexuousness need not be strictly considered.

<Torsional Rigidity C>

The torsional rigidity C substituted into mathematical expression (3) can be calculated by a higher-order mathematical expression based on the thickness (diameter) of the wire harness. In this embodiment, a quadratic mathematical expression containing the coefficients calculated by multivariate analysis or the like on the basis of the values obtained by conducting experiments on various types of wire harnesses. This method is generally known, and hence a detailed description thereof will be omitted.

<Weight of Wire Harness>

The weight of a wire harness per unit length changes depending on the type and number of electric wires (interface members) bundled in the wire harness. If the application purpose of a wire harness or electrical components to which the wire harness is to be connected is limited to a certain degree (e.g., in calculating the shape of a wire harness arranged in the engine room of an automobile), the type of electric wires and the number of electric wires to be bundled can be limited. Variations in the types and numbers of electric wires can be replaced with the thickness (diameter) of a wire harness.

In this embodiment, the relationship between the thicknesses of various wire harnesses and their weights per unit length is measured in advance. When the operator inputs the thickness of a wire harness whose shape is to be obtained, the weight of the wire harness per unit length can be automatically selected by using the measurement result.

Alternatively, as described above, if an electrical component as a connection destination is determined, the wire harness to be used can be limited. Therefore, the weight of the wire harness (to be selected) per unit length may be automatically selected when the operator selects an application purpose of the wire harness whose shape is to be obtained or an electrical component to which the wire harness is to be connected.

<Wiring Design Support Apparatus>

The arrangement of the wiring design support apparatus according to this embodiment will be described below, which calculates the wiring shape of a wire harness by using the above values and mathematical expressions according to a procedure described below.

Figure 12:
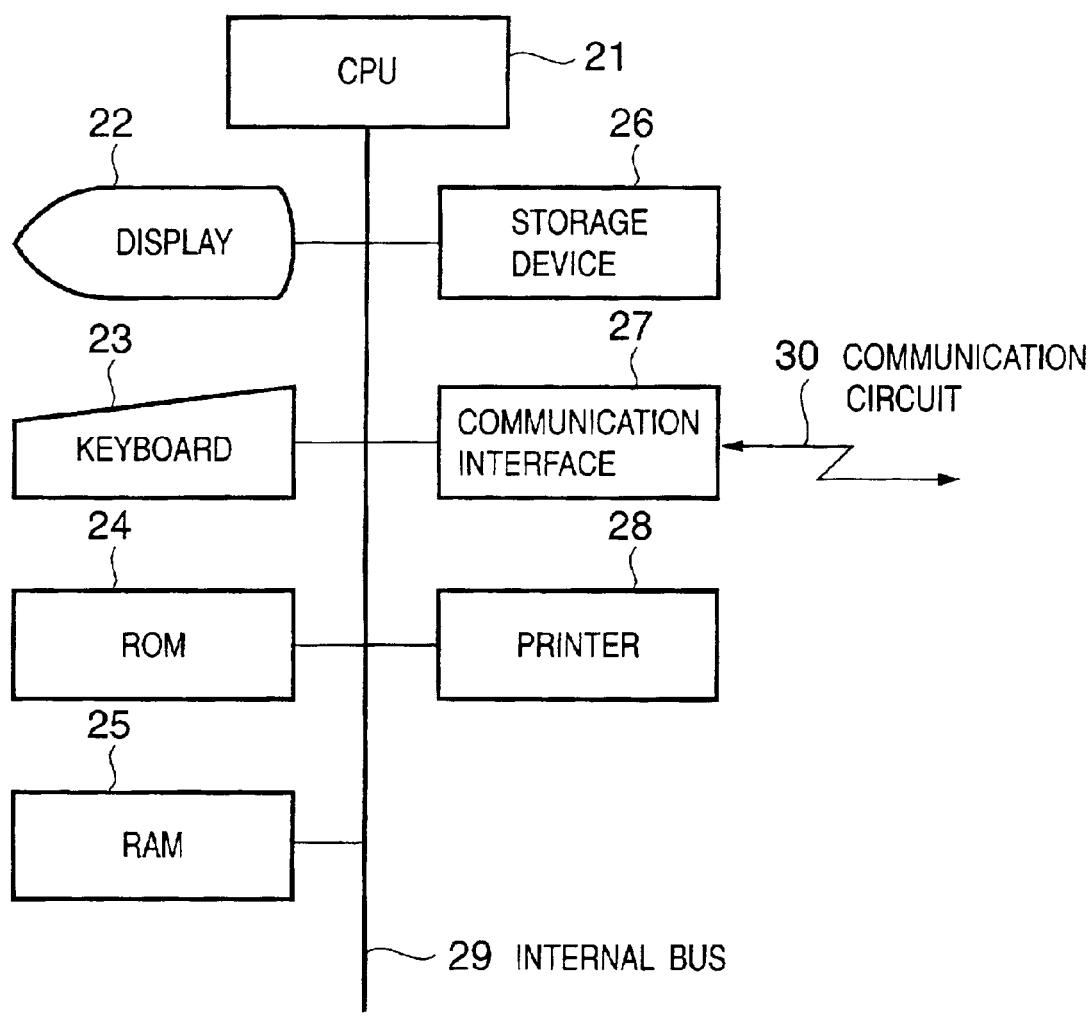
FIG. 12 is a block diagram showing the arrangement of an interface member wiring design support apparatus according to this embodiment.

FIG. 12 is a block diagram showing the interface member wiring design support apparatus according to this embodiment.

Referring to FIG. 12, reference numeral 22 denotes a display such as a CRT; and 23, a keyboard serving as an input means. In this embodiment, the display 22 and keyboard 23 constitute a so-called man-machine interface.

Reference numeral 24 denotes a ROM storing a boot program and the like; 25, a RAM for temporarily storing various results; 26, a storage device (storage unit) such as a hard disk drive (HDD) for storing a program for calculating the wiring shape of a wire harness (as will be described later) and the like; 27, a communication interface for communicating with an external device via a communication line 30; and 28, a printer for printing processing results and the like. These constituent elements are connected to each other via an internal bus 29. A CPU (Central Processing Unit) 21 serving as an arithmetic control unit controls the overall wiring design support apparatus in accordance with the programs stored in the storage device 26.

As this interface member wiring design support apparatus, a general-purpose computer capable of implementing software for implementing calculation processing (mainly constituted by basic shape calculation processing and balanced shape calculation processing) for the wiring shape of a wire harness (to be described later) can be used.

<Basic Shape Calculation Processing>

Processing of calculating the shape of a wire harness whose two ends are to be fixed to predetermined positions (including the case of free ends) with the thickness (diameter) remaining unchanged throughout its length by using the above mathematical expressions will be described next. This processing (to be referred to as basic shape calculation processing hereinafter) is processing for a shape simulation in wiring a wire harness having branch portions and portions with different thicknesses and operation of repeating calculation until the respective portions of the shape are dynamically balanced.

Figure 6:
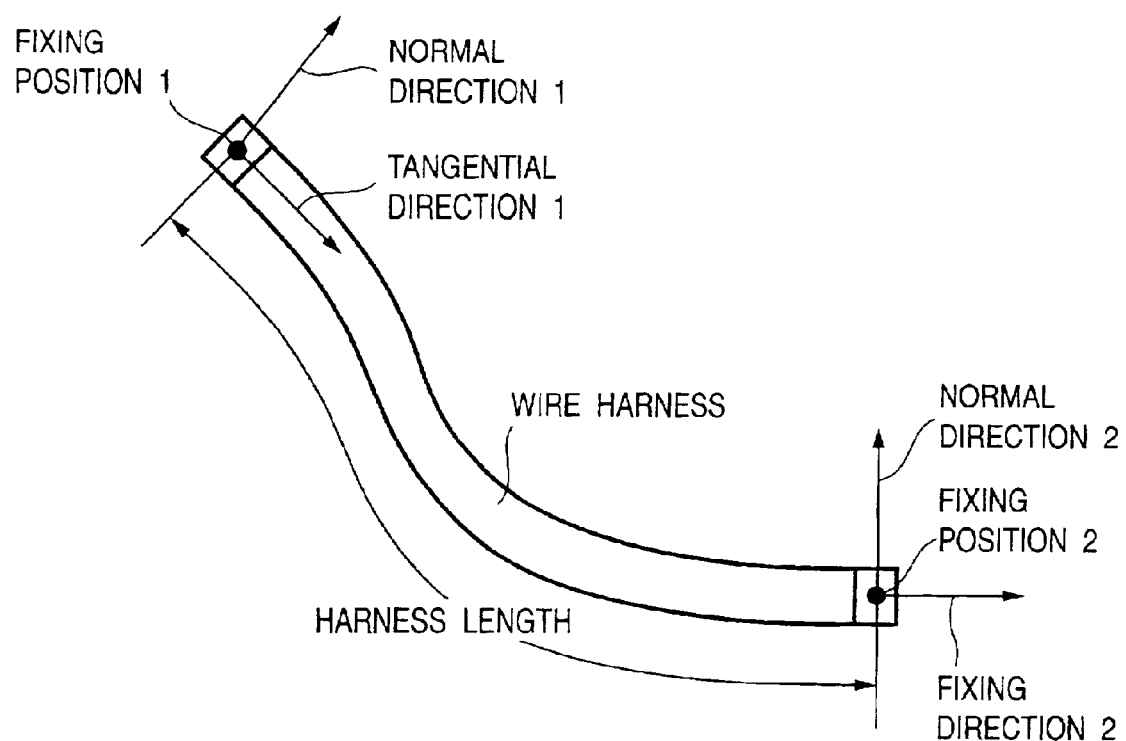
FIG. 6 is a view for explaining the shape of one wire harness which is to be calculated in basic shape calculation processing in this embodiment and the parameters that should be input by an operator to calculate the shape.

FIG. 6 is a view for explaining the shape of one wire harness which is calculated in basic shape calculation processing in this embodiment and parameters to be input by the operator to calculate the shape.

Figure 7:
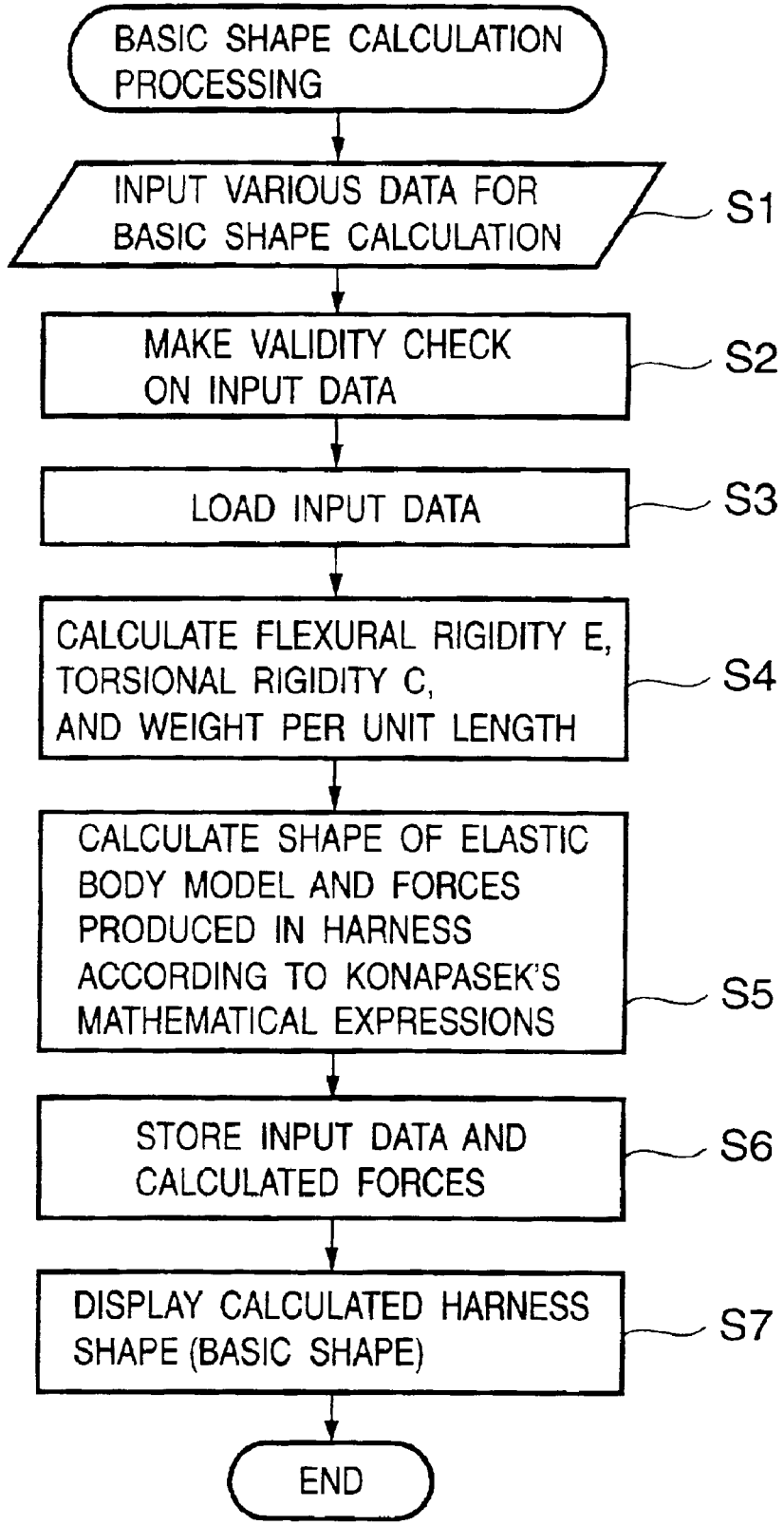
FIG. 7 is a flow chart showing basic shape calculation processing in this embodiment.

FIG. 7 is a flow chart showing basic shape calculation processing in this embodiment.

Referring to FIG. 7, in step S1, the operator is prompted to input various predetermined data for basic shape calculation. More specifically, the operator is required to input data in the following items:

1: the thickness (diameter) $\phi$ (mm) of a target wire harness,
2: the coordinate value of fixing position 1 with respect to an outer interference surface of the target wire harness in the global coordinate system,
3: tangential direction 1 representing the fixing direction at fixing position 1,
4: tangential direction 1 representing the direction at fixing position 1 (this direction may be automatically calculated in accordance with input tangential direction 1 ),
5: the coordinate value of fixing position 2 with respect to an outer interference surface of the target wire harness in the global coordinate system,
6: tangential direction 2 representing the fixing direction at fixing position 2,
7: tangential direction 2 representing the direction at fixing position 2 (this direction may be automatically calculated in accordance with input tangential direction 2 ),
8: the type of protective member (e.g., a tape) covering the target wire harness,
9: a length L (mm) of the target wire harness (if an automatically calculated length is used, this data need not be input),
10: designation indicating whether to perform shape calculation in consideration of the torsion (moment) produced in the target wire harness when the wire harness is fixed at fixing positions 1 and 2 (this data is input when a balanced shape (to be described later) is to be calculated by connecting a plurality of basic shapes (a plurality of wire harnesses) generated by this basic shape calculation processing), and
11: the types of fixing members (including free ends indicating branch portions) used to fix the target wire harness at fixing positions 1 and 2.

As a method of inputting the coordinate values of fixing positions 1 and 2, one of the following methods may be used: a method of loading, in this step, data about an interference surface (e.g., a wire frame model or solid model) designed in another step, displaying the data on the display 22, and allowing the operator to select desired positions on the displayed model with a pointing device such as a mouse, and a method of directly inputting coordinate values.

In the storage device 26, the above value K of a protective member is stored in advance in correspondence with the type of protective member. In this step, when the type of protective member is selected, the coefficient K to be used is determined.

In addition, in the storage device 26, the thickness of a wire harness which is determined in accordance with the number of electric wires to be bundled into one wire harness may be stored in advance, and the operator may be made to select the number of electric wires to be bundled into the target wire harness in this step, thus automatically determining the diameter of the wire harness.

In addition, a table indicating the degrees of freedom of the respective fixing members described with reference to FIG. 4 may be stored in advance as constraint conditions in the storage device 26. When the operator selects fixing members for fixing positions 1 and 2 in this step, the wiring design support apparatus can recognize the degrees of freedom at the respective fixing positions.

In steps S2 and S3, general validity checks, e.g., checks on the number of input items and the number of digits or characters, are performed for the data in the respective items which are input in step S1 (step S2), and then the data are loaded into the main storage of the CPU 21 (step S3).

In step S4, the flexural rigidity E is calculated by substituting the input (or determined) thickness of the target wire harness and the selected coefficient K into mathematical expression (5) described above. In this case, as the curvature ρ, the maximum curvature of the target wire harness is used to implement efficient arithmetic operation.

In step S4, the weight of the target wire harness per unit length is calculated. This weight may be calculated by storing the relationship between the thickness of each wire harness and the weight per unit length in advance as a lookup table in the storage device 26 or the like and looking up the lookup table with the thickness input in the step S1. As described above, the torsional rigidity C is calculated by substituting the diameter of the wire harness, input in step S1, into a quadratic mathematical expression empirically obtained by experiment.

In step S5, by substituting the tangential directions and normal directions at fixing positions 1 and 2 of the target wire harness, input in step S1, and the values calculated in step S4 into the above Konapasek's mathematical expressions, the shape of the wire harness as an elastic body model fixed at fixing positions 1 and 2 and the forces F and moments M produced in the model are calculated.

In step S6, the data in the respective items input in step S1 and the forces F and moments M calculated in step S5 are stored in the storage device 26. More specifically, at least the thickness φ of the wire harness, the calculated (or input) length L, the normal direction vectors at fixing positions 1 and 2, a torsion (m/radian) representing the amount of torsion between the two positions, and the calculated forces F are stored (all the input data may be stored).

In step S7, the calculated shape (basic shape) of the target wire harness is displayed on the display 22, and at the same time, the forces F acting at fixing positions 1 and 2 are displayed as vectors representing the magnitudes and directions of the forces.

Figure 13:
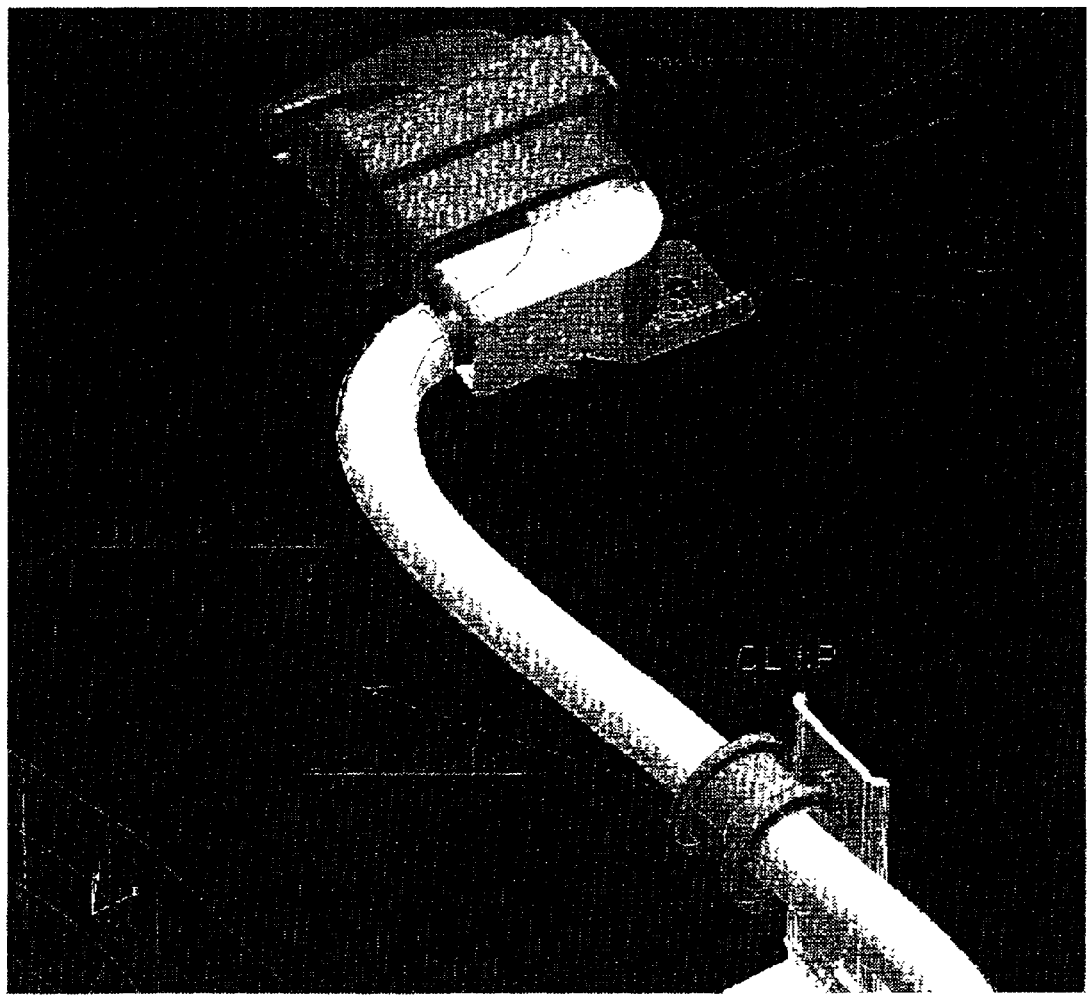
FIG. 13 is a view showing an example of how the shape of a wire harness and forces F calculated in balanced shape calculation processing according to this embodiment are displayed.

FIG. 13 is a view showing an example of how the shape of the wire harness and forces F calculated in the basic shape calculation processing in this embodiment are displayed. According to the wire harness shown in FIG. 13, a connector is attached at fixing position 1 on the upper side, and a stationary clip is attached at fixing position 2 on the lower side. The magnitudes and directions of forces produced at fixing positions 1 and 2 of the wire harness bent in the form shown in FIG. 13 are displayed.

According to the above basic shape calculation processing, since the resultant forces F produced in the calculated basic shape are displayed, the operator can easily make a visual check on the directions and magnitudes of forces required to fix fixing members such as connectors and the positional relationship between the wire harness and surrounding interfering objects, thereby improving the support performance in design.

Figure 14:
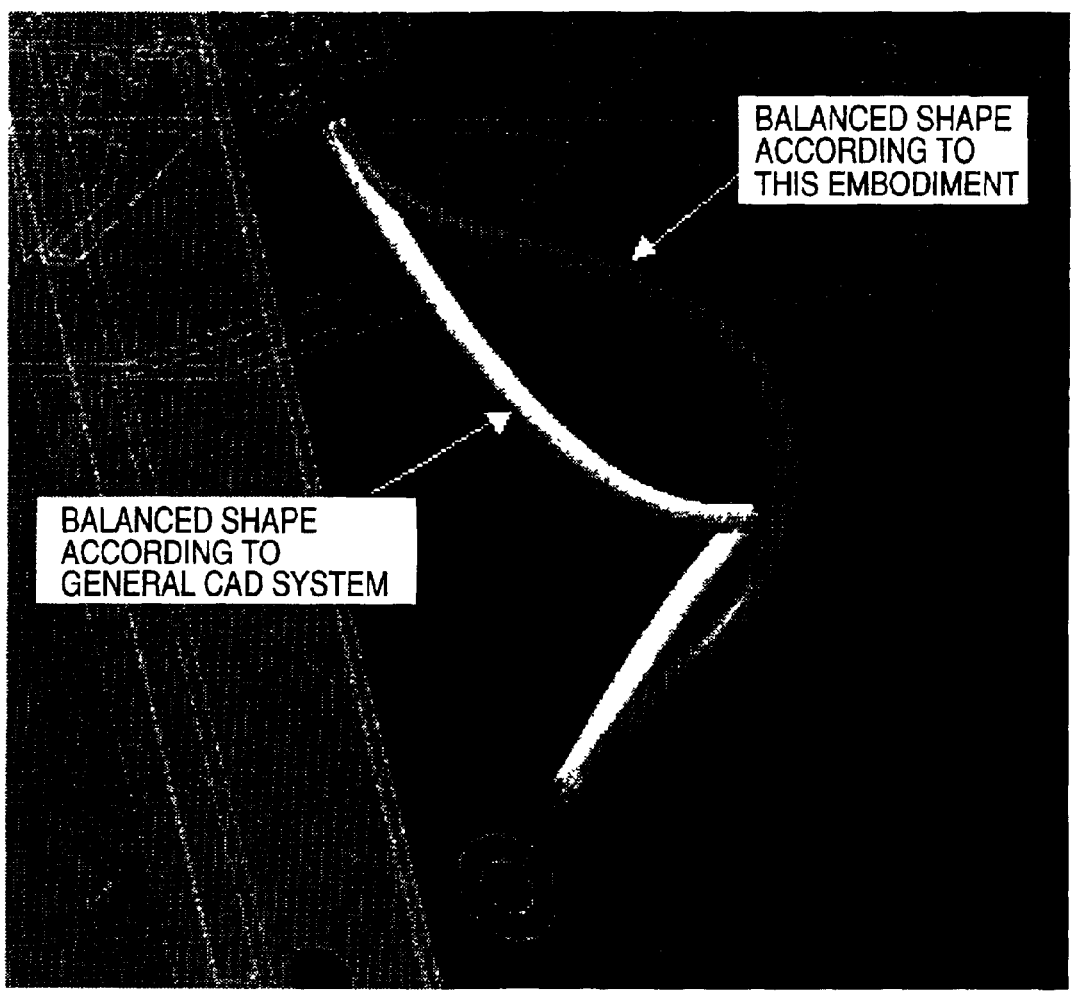
FIG. 14 is a view showing a comparison between the shape of a wire harness calculated in balanced shape calculation processing according to this embodiment and the shape of the wire harness calculated by a general CAD system.

FIG. 14 is a view showing a comparison between the shape of a wire harness calculated in basic shape calculation processing according to this embodiment and the shape of a wire harness calculated by a general CAD system. Obviously, the shape of the wire harness calculated by the general CAD system is unnaturally twisted because of lack of consideration of the flexural rigidity and weight of the wire harness as compared with the shape of the wire harness according to this embodiment.

<Balanced Shape Calculation Processing>

Processing of calculating a dynamically balanced shape (to be referred to as balanced shape calculation processing hereinafter) when a wire harness whose shape is calculated by the above basic shape calculation processing is fixed at an end portion (including a free end) will be described next.

When the wire harness whose shape is calculated in the above basic shape calculation processing is disposed in a three-dimensional space based on the global coordinate system, the force and moment produced at the end portion (fixing position 1 or 2) of the wire harness are represented by $F_i$ and $M_i$.

When a plurality of wire harnesses constitute a given end portion to form a branch point, the resultant force and resultant moment produced at the branch point can be calculated by the following general mathematical expressions:

$$\text{force } F = \Sigma F_i \quad (6)$$

$$\text{moment } M = \Sigma M_1 \quad (7)$$

Conditions for a balance at the end portion of the wire harnesses having the above dynamic relationship will be described next. The conditions are:

in the case of the branch point (free end): both the resultant force F and resultant moment M calculated by mathematical expressions (6) and (7) should be zero; and in the case of a rotating clip: the moment component obtained by projecting the resultant moment M calculated by mathematical expression (7) onto the rotation axis (i.e., the normal direction) of the rotating clip should be zero.

In the case of the rotating clip, since each wire harness is restricted to be movable around the axis, there is no need to consider any conditions for a balance with respect to the resultant force F. Similarly, if the end point is a connector or stationary clip, since each wire harness is restricted with 0 degree of freedom, there is no need to consider any conditions for a balance.

The above dynamically balanced relationship will be described below by exemplifying the dynamic relationship between a plurality of wire harnesses connected to a branch point.

Figure 8:
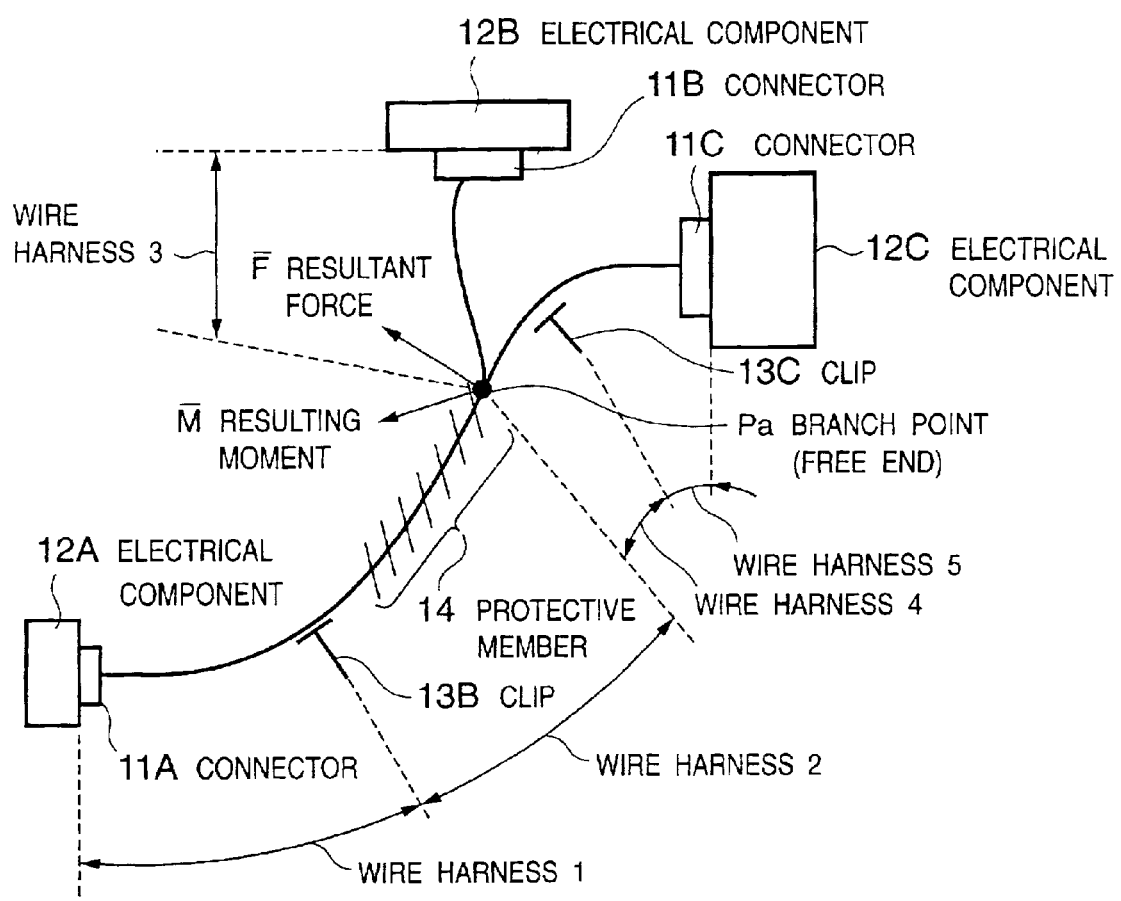
FIG. 8 is a view showing an example of a wire harness unit having a branch portion to be subjected to balanced shape calculation processing in this embodiment.

FIG. 8 shows the shapes of wire harnesses having a branch portion to be subjected to balanced shape calculation processing in this embodiment.

The wire harnesses shown in FIG. 8 are example wire harnesses having one branch point Pa which is selected by the operator as a target for balanced shape calculation processing. For example, these wire harnesses include a wire harness located on the left side of the branch point Pa and incorporating a bundle of five electric wires and two wire harnesses located on the right side of the branch point Pa and respectively incorporating a bundle of two electric wires and a bundle of three electric wires.

The operator has already calculated a plurality of basic shapes constituting these wire harnesses before balanced shape calculation processing is performed for the overall wire harness unit. The wire harness unit shown in FIG. 8 is formed by connecting five wire harnesses (wire harnesses 1 to 5) which are calculated as basic shaped by basic shape calculation processing. The arrangements of the wire harnesses 1 to 5 will be described below:

wire harness 1: a wire harness having a connector 11A at fixing position 1 and a clip 13B (a stationary clip or rotating clip) at fixing position 2;

wire harness 2: a wire harness which has a clip 13B (a stationary clip or rotating clip) at fixing position 1 and the branch point Pa at fixing position 2 and is protected by a protective member 14;

wire harness 3: a wire harness having the branch point Pa at fixing position 1 and a connector 11B at fixing position 2;

wire harness 4: a wire harness having the branch point Pa at fixing position 1 and a clip 13C (stationary clip or rotating clip) at fixing position 2; and wire harness 5: a wire harness having a clip 13C at fixing position 1 and a connector 11C at fixing position 2.

Figure 9:
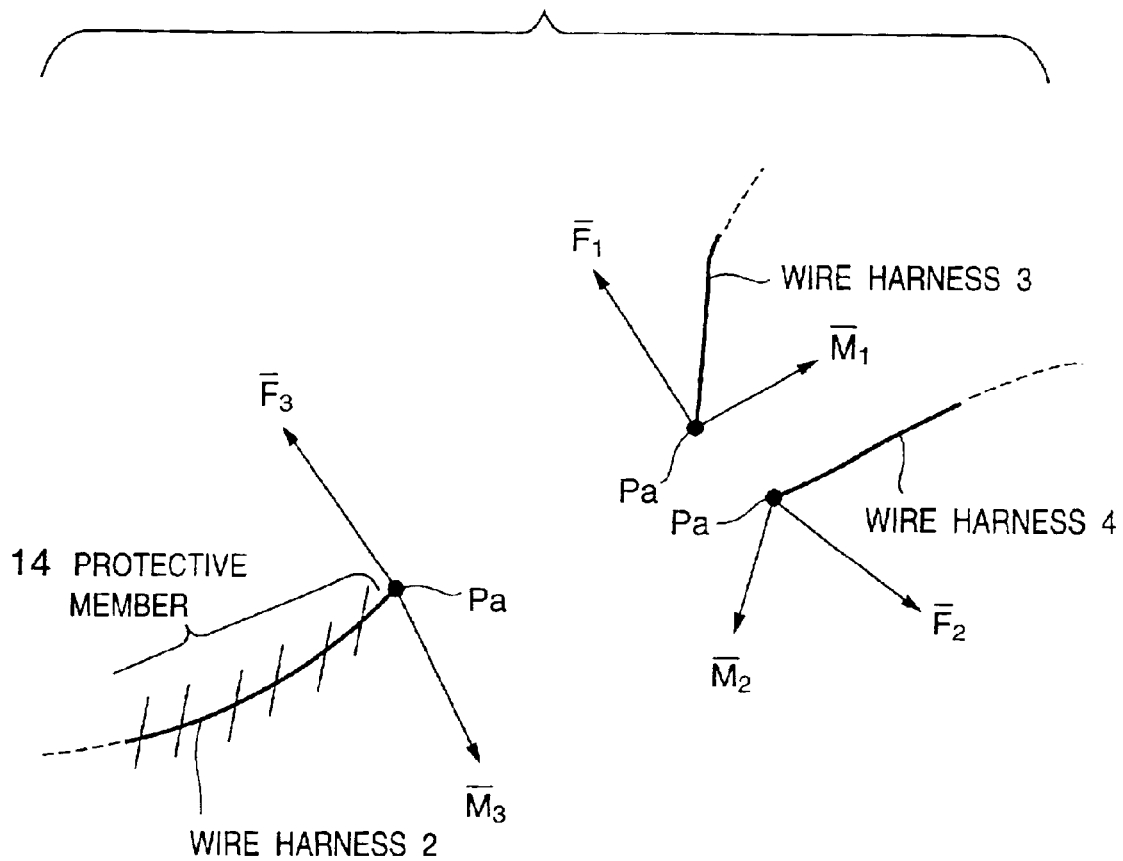
FIG. 9 is a view for explaining forces and moments produced in wire harnesses 2 to 4 constituting a branch point Pa included in the wire harness unit shown in FIG. 8.

FIG. 9 is a view for explaining the forces and moments produced in the wire harnesses 2 to 4 constituting the branch point Pa included in the wire harness unit shown in FIG. 8. The respective end points of the wire harnesses 2 to 4 in FIG. 9 are actually connected to the branch point Pa at the same position. For the sake of descriptive and illustrative conveniences, however, they are expressed separately.

At the branch point Pa in FIG. 9, a force $F_3$ and moment $M_3$ are produced at fixing position 2 of the wire harness 2; a force $F_1$ and moment $M_l$, at fixing position 1 of the wire harness 3; and a force $F_2$ and moment $M_2$, at fixing position 1 of the wire harness 4. These forces and moments are values obtained by basic shape calculation processing for the wire harnesses 2 to 4.

Consider the case shown in FIG. 9 applied to athematical expressions (6) and (7). The resultant force F at the branch point Pa can be obtained by adding the vectors of the forces $F_1$, $F_2$, and $F_3$. The resultant moment M at the branch point Pa can be obtained by adding the vectors of the moments $M_1$, $M_2$, and $M_3$.

A dynamically balanced shape at the branch point Pa at which a resultant force and resultant moment can be calculated in such calculation can be obtained by setting (moving) the branch point Pa in a three-dimensional space based on the global coordinate system to a position where both the calculated resultant force F and resultant moment M become zero.

When the above dynamically balanced shape is applied to a rotating clip, the orientation (direction) of the rotating clip fixed on a rotation axis can be obtained by rotating the calculated resultant moment until the moment component projected onto the rotation axis becomes zero.

A position (or orientation) where the above conditions for a balance are satisfied can be calculated by using the optimal value (optimal solution) calculation method that is generally practiced in arithmetic processing by a computer.

This method is applied to this embodiment in the following manner. For example, the resultant force and resultant moment produced in a given basic shape or shape obtained by combining a plurality of basic shapes are calculated in the above manner, and it is checked whether the calculation results satisfy the corresponding conditions. If they do not satisfy the conditions, the target end portion (free end) is rotated or moved by a predetermined amount, and a basic shape at the new position after the rotation or movement is calculated again. A resultant force and resultant moment are then calculated again by using the new basic shape, and it is checked whether the calculation results satisfy the corresponding conditions. When such processing is repeated and the calculation results provide a reverse determination to that provided in the preceding step at a given time point, the end portion (free end) is rotated or moved in the reverse direction to that in the previous steps by a small amount. Similar processing may be performed until the corresponding conditions are satisfied.

A procedure for balanced shape calculation processing that implements the above description will be described next.

Figure 10:
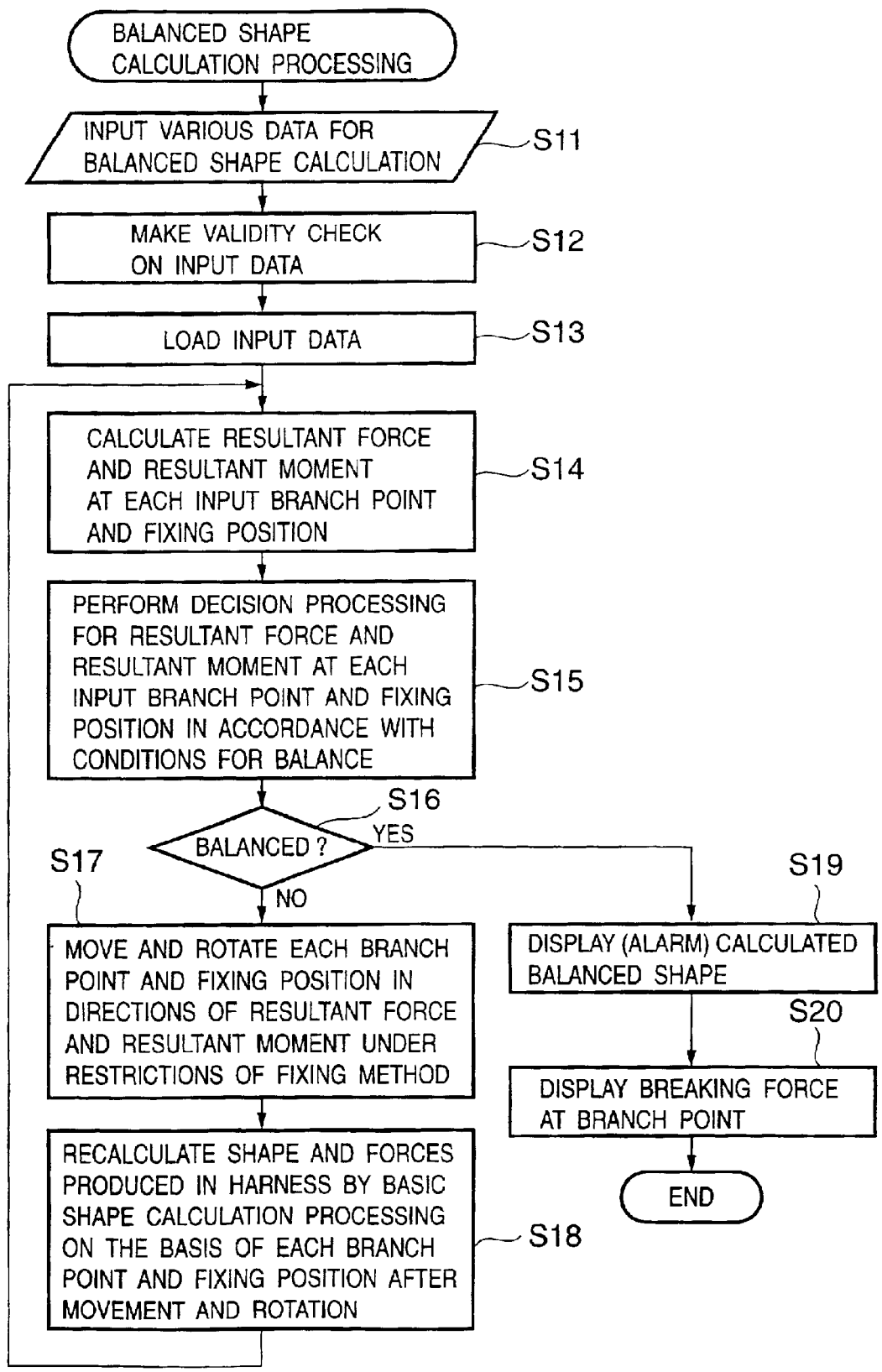
FIG. 10 is a flow chart showing balanced shape calculation processing in this embodiment.

FIG. 10 is a flow chart showing balanced shape calculation processing in this embodiment.

Referring to FIG. 10, in step S11, the operator is prompted to input predetermined various data for balanced shape calculation. More specifically, the operator is required to input data in the following items:

1: designation indicating a basic shape or wire harness shape constituted by a plurality of basic shapes from which a balanced shape is calculated; and 2: type data (identification data of a rotating clip, free end, or the like) of a fixing position of the shape in item 1 given above.

Note that the type data of each fixing position may be loaded, together with the shape data, if each type data has already been set in each basic shape calculation processing.

In steps S12 and S13, general validity checks (step S12) such as a check on the number of input items and a check on the number of digits or characters are made on the data in the respective items input in step S11, and then these data are loaded into the main storage of the CPU 21 (step S13).

In step S14, the resultant forces F and resultant moments M in the wire harness designated in step S11 are calculated according to mathematical expressions (6) and (7) given above on the basis of the forces and moments at fixing positions and branch points (free ends) loaded in step S13.

In step S15, it is checked whether the resultant forces F and resultant moments M calculated in step S14 satisfy the above predetermined conditions for a balance with respect to all the end portions (fixing points and free ends) included in the wire harness input in step S11.

If NO in step S15 (there is an end portion at which the predetermined conditions for the balance are not satisfied), the flow advances to step S16. If YES in step S15 (the predetermined conditions for the balance are satisfied at all the end portions), the flow advances to step S18.

In step S17, each end point (each of fixing points and free ends) is moved and rotated by a predetermined amount in the direction of the resultant force F and resultant moment M calculated at the end point under the restrictions of the predetermined conditions for the balance.

In step S18, a shape and forces produced in each end portion are recalculated on the basis of the position of each end point (each of the fixing points and free ends) after movement and rotation. The flow then returns to step S14. At this time, the shape may be recalculated by calling the processing in step S4 and the subsequent steps in the basic shape calculation processing (FIG. 7).

In step S19, a shape (balanced shape) in which each end point satisfies the predetermined conditions for the balance is displayed on the display 22, and at the same time, the force F acting on each end point is displayed as a vector representing the magnitude and direction of the force. In this case, if the forces acting on a connector and stationary clip exceed a predetermined value, the colors of the corresponding vectors to be displayed are changed, or they are displayed together with characters or the like, thereby allowing the operator to easily recognize that excessively large forces are acting on the fixing positions (end points) with 0 degree of freedom.

Figure 15:
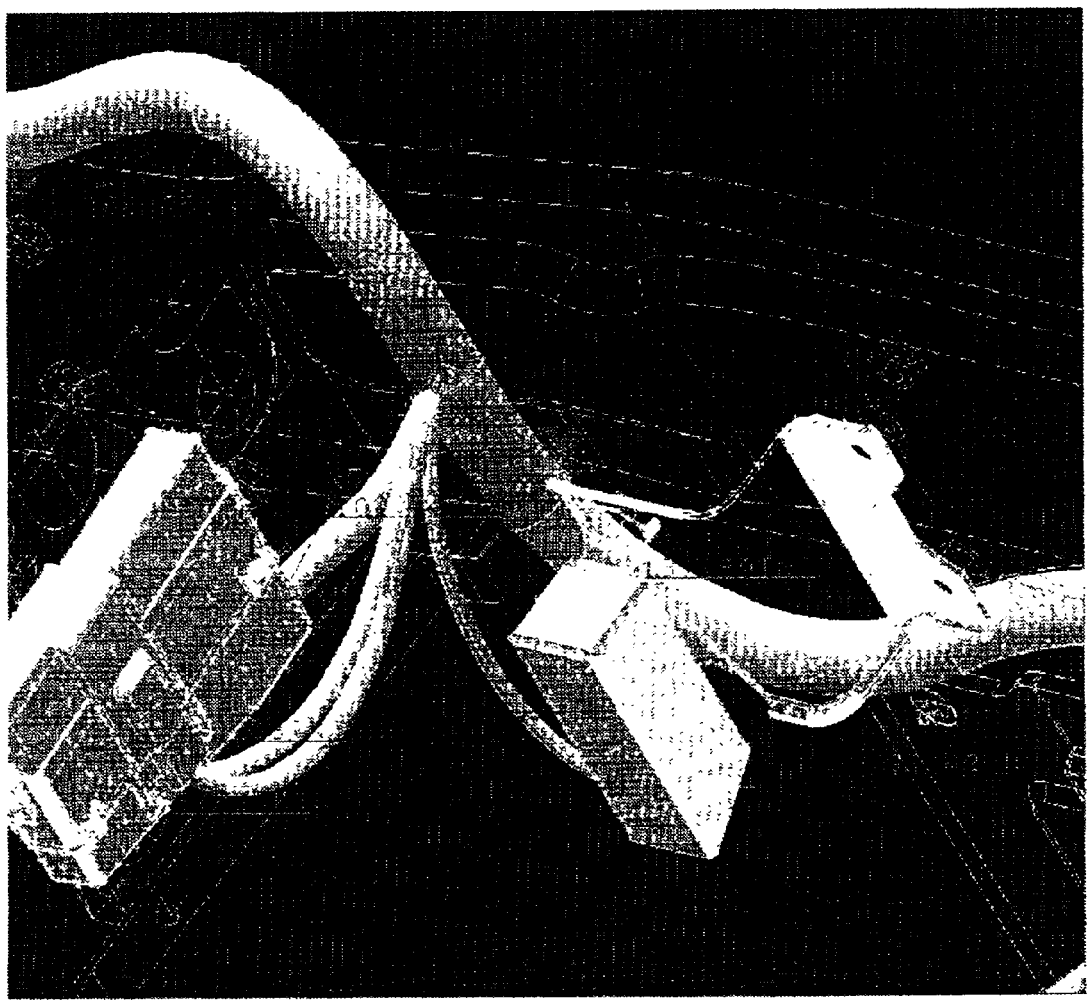
FIG. 15 is a view showing an example of how the shape of a wire harness and forces F calculated in balanced shape calculation processing according to this embodiment are displayed.

FIG. 15 shows an example of how the shape of the wire harness and forces F calculated in balanced shape calculation processing according to this embodiment are displayed.

FIG. 15 shows only one end portion of the wire harness which has a branch point because of the size of an illustration that can be shown. The magnitudes and directions of forces produced at the respective fixing positions are displayed.

In step S20, if a branch point is included in the wire harness designated in step S11, a breaking force at the branch point is displayed.

Figure 11:
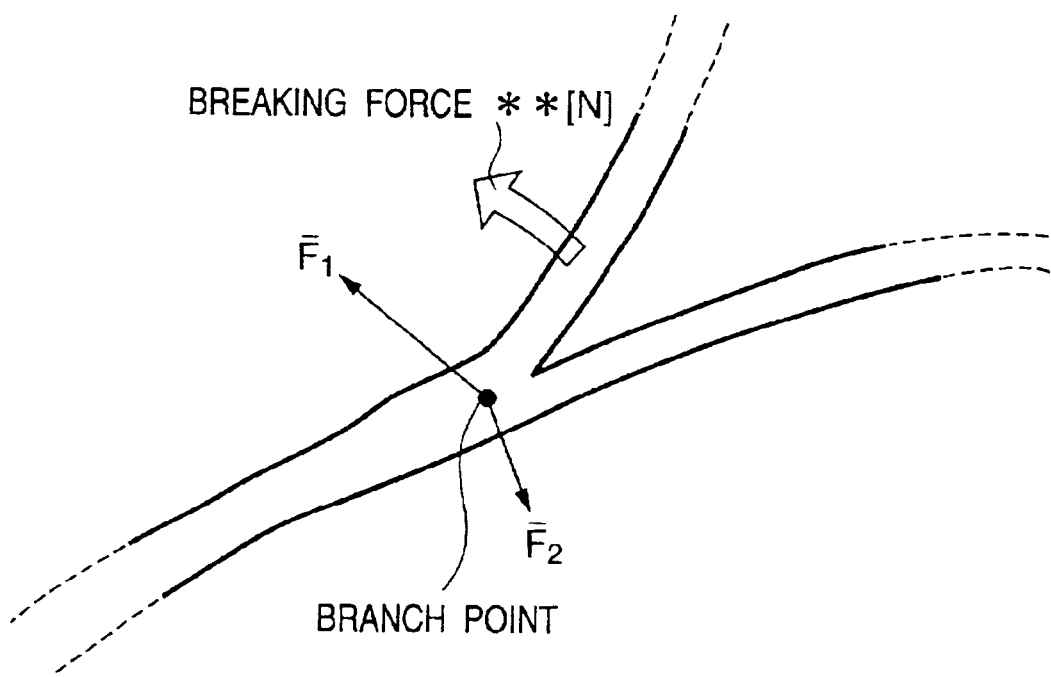
FIG. 11 is a view for explaining how a breaking force at a branch point is displayed.

FIG. 11 is a view for explaining how the breaking force at the branch point is displayed. If the conditions for a balance are satisfied at the branch point, the vectors of forces $F_1$ and $F_2$ produced at the branch point from which the two thin wire harnesses branch off are added, and the result is displayed with an arrow and numerical value.

In the case shown in FIG. 11, since the force $F_1$ is considerably larger than the force $F_2$, the breaking force and its numerical value which represent the result of vector addition are displayed on the upper branch wire harness. This allows the operator to easily predict that rupture will take place at the branch point if the calculated breaking force is excessively large although the branch point is dynamically stationary.

According to the above balanced shape calculation processing, an optimal balanced shape can be automatically calculated, and at the same time, the magnitudes of forces produced in the respective end portions are displayed. This allows the operator to easily make a visual check on the directions and magnitudes of forces required to fix fixing members such as connectors and the positional relationship between the wire harness and surrounding interfering objects, thereby improving the support performance in design.

According to the balanced shape calculation processing, in a so-called concurrent engineering environment in which design operations are concurrently performed in the respective sections, even if the shape of the final interference surface cannot be obtained from a design section in the preceding step (i.e., only a poor-precision shape model without any detailed product shape portions can be obtained), the balanced shape of a target wire harness can be grasped by using the obtained interference surface shape (or coordinate values). This improves the design efficiency.

Even if the interface member to be used, the presence/absence of a protective member, the type of clip, and the like must be changed afterward in accordance with a change in specifications which has occurred in the design section in the preceding step, such a change can be flexibly and quickly made in accordance with the change in specifications by inputting set items associated with the change again and recalculating the above basic shape and balanced shape.

As has been described above, according to this embodiment, in performing wiring design of a wire harness (interface member) by using a computer, when the user only inputs simple set items, the practical shape of the target wire harness can be automatically calculated and informed.

In addition, according to this embodiment, in performing wiring design of a wire harness (interface member) by using a computer, when the user only inputs simple set items, the user can easily recognize forces acting on the fixing positions of the wire harness with the magnitudes and directions of the forces. Since the user can give consideration to the state of the forces, he/she can perform optimal design.

Furthermore, according to this embodiment, a plurality of types of methods as choices can be prepared as methods of fixing a wire harness. This expands the application range of this wiring design support apparatus.

Moreover, according to this embodiment, even if a fixing position can be rotated or moved, an accurate shape can be automatically calculated and informed with simple set items.

More specifically, the wiring design support apparatus according to this embodiment can accurately calculate a rotating force produced at a rotatable fixing position, the shape of a composite interface member including a branch portion, and the balanced shape of an interface member including a movable branch portion.

As many apparently widely different embodiments of the present invention can be made without departing from the spirit and scope thereof, it is to be understood that the invention is not limited to the specific embodiments thereof except as defined in the appended claims.

What is claimed is:

1. A computer-implemented interface member wiring design support apparatus, comprising:
   an arithmetic control unit configured to calculate a wiring shape of an interface member on a basis of a plurality of input fixing positions and a modulus of deformation of an interface member so as to satisfy the fixing positions; and
   a display unit configured to display the wring shape of the interface member calculated by said arithmetic control unit,
   wherein said arithmetic control unit calculates a flexural rigidity E of a target interface member by a predetermined bi-quadratic function associated with a curvature ρ of the interface member on a basis of an input interface member diameter φ, and calculates a wiring shape of the interface member by using the calculated flexural rigidity E.

2. The apparatus according to claim 1, wherein the predetermined bi-quadratic function is $$\text{flexural rigidity } E=f(\phi, \rho)=G(a_0(\phi)+a_1(\phi)\ \rho+a_2(\phi)\ \rho^2)\times K$$

where $a_0(\phi)$, $a_1(\phi)$, and $a_2(\phi)$ are predetermined constants corresponding to the interface member diameter φ, G is a gravitational acceleration, and K is a constant determined in accordance with a type of protective member.

3. The apparatus according to claim 1, wherein said arithmetic control unit uses a maximum curvature of a target interface member as the curvature ρ to calculate the flexural rigidity E.

4. The apparatus according to claim 1, wherein the predetermined bi-quadratic function is set such that the calculated flexural rigidity E decreases as the curvature ρ increases.

5. The apparatus according to claim 1, wherein
   said wiring design support apparatus further comprises a storage unit in which as moduli of a plurality of types of interface members which can be selected as design targets, a relationship between diameters φ of the interface members, torsional rigidities C of the interface members, and weights of the interface members per unit length is stored in advance, and said arithmetic control unit calculates a wiring shape of a target interface member on a basis of the flexural rigidity E calculated by the predetermined bi-quadratic function and the torsional rigidity C and a weight per unit length supplied from said storage unit in accordance with the diameter φ of the target interface member.

6. The apparatus according to claim 5, wherein said arithmetic control unit calculates a wiring shape of the target interface member by substituting the flexural rigidity E, the torsional rigidity C, and the weight per unit length into Konapasek's mathematical expressions.

7. A computer-readable storage medium storing a program code which causes a computer to operate as said interface member wiring design support apparatus defined in claim 1.

8. An interface member wiring design support apparatus, comprising:

an arithmetic control unit configured to calculate a wiring shape of an interface member on a basis of a plurality of input fixing positions and a modulus of deformation of an interface member so as to satisfy the fixing positions; and a display unit configured to display the wring shape of the interface member calculated by said arithmetic control unit, wherein said arithmetic control unit, when calculating a wiring shape of a target interface member, calculates forces acting at the plurality of fixing positions due to the interface member, and said display unit displays information associated with the forces calcultated by said arithmetic control unit.

9. The apparatus according to claim 8, wherein said display unit displays a magnitude and direction of each force as the information associated with the forces.

10. The apparatus according to claim 8, wherein if any of the forces exceeds a predetermined value set in advance as a design strength at each of the respective fixing positions when said display unit displays the information associated with the forces, said arithmetic control unit generates a corresponding warning.

11. The apparatus according to claim 8, wherein said arithmetic control unit can designate degrees of freedom at the plurality of fixing positions with respect to the target interface member as input items for the fixing positions.

12. The apparatus according to claim 8, wherein said arithmetic control unit can designate, as a degree of freedom at the fixing position, whether the interface member can rotate at the fixing position in a normal direction, and when the fixing position is designated as a position at which the interface member can rotate, said arithmetic control unit calculates a force that causes the interface member to rotate in the normal direction as a force applied to the fixing position by the interface member.

13. The apparatus according to claim 8, wherein said arithmetic control unit calculates a flexural rigidity E of the target interface member by a predetermined bi-quadratic function associated with a curvature ρ of the interface member on the basis of an input interface member diameter φ, and calculates a wiring shape of the interface member by using the calculated flexural rigidity E.

14. A computer-readable storage medium storing a program code which causes a computer to implement the interface member wiring design support method defined in claim 8.

15. An interface member wiring design support apparatus, comprising:

an arithmetic control unit configured to calculate a wiring shape of an interface member on a basis of a plurality of input fixing positions, fixing directions at the fixing positions, and a modulus of deformation of the interface member so as to satisfy the fixing positions; and a man-machine interface configured to be capable of designating whether a target interface member can rotate in a normal direction at least at one fixing position of the target interface member, wherein, when at least one fixing position is designated by said man-machine interface as a position at which the interface member can rotate, said arithmetic control unit calculates a shape of the interface member, and calculates a force that causes the interface member to rotate in the normal direction at the designated fixing position.

16. The apparatus according to claim 15, wherein a fixing position that can be designated by said man-machine interface as a position at which the interface member can rotate or cannot rotate is an end portion position of the interface member, and position information input as the end portion position is a temporary fixing position which can be moved by said arithmetic control unit in calculating a shape of the interface member, and when position information common to a plurality of target interface members is designated by said man-machine interface as the temporary fixing position at one end portion of the plurality of interface members, said arithmetic control unit calculates an overall shape of a composite interface member constituted by the plurality of interface members including the common position information as a branch point and a dynamically balancing position of the overall shape to which the branch point should be located by recalculating the overall shape every time the common position information is moved by a predetermined amount.

17. The apparatus according to claim 15, wherein said arithmetic control unit calculates a flexural rigidity E of the interface member by a predetermined bi-quadratic function associated with a curvature ρ of the interface member on a basis of an input interface member diameter φ, and calculates a wiring shape of the interface member by using the calculated flexural rigidity E.

18. A computer-readable storage medium storing a program code which causes a computer to operate as said interface member wiring design support apparatus defined in claim 15.

19. An interface member wiring design support apparatus, comprising:

an arithmetic control unit configured to calculate a wiring shape of an interface member on a basis of at least three fixing positions, fixing directions at the fixing positions, and a modulus of deformation of the interface member so as to satisfy the fixing positions; and a display unit configured to display the wiring shape of the interface member calculated by said arithmetic control unit, wherein when a target interface member includes a branch point, said arithmetic control unit calculates a shape of an interface member including the branch point, and a dynamically balancing position at which the branch point is to be located owing to the shape.

20. The apparatus according to claim 19, wherein said arithmetic control unit calculates a breaking force produced at the branch point, and said display unit displays the breaking force calculated by said arithmetic control unit.

21. The apparatus according to claim 19, wherein said arithmetic control unit calculates a flexural rigidity E of the interface member by a predetermined bi-quadratic function associated with a curvature ρ of the interface member on a basis of an input interface member diameter φ, and calculates a wiring shape of the interface member by using the calculated flexural rigidity E.

22. A computer-readable storage medium storing a program code which causes a computer to operate as said interface member wiring design support apparatus defined in claim 19.

23. An interface member wiring design support method of calculating an interface member wiring shape on a basis of a plurality of fixing positions and a modulus of deformation of an interface member so as to satisfy the fixing positions, comprising:

calculating a flexural rigidity E of a target interface member by a predetermined bi-quadratic function associated with a curvature ρ of the interface member on a basis of an input interface member diameter φ, and calculating a wiring shape of the interface member by using the calculated flexural rigidity E.

24. The method according to claim 23, wherein the predetermined bi-quadratic function is flexural rigidity $E=f(\phi, \rho)=G(a_0(\phi)+a_1(\phi) \rho+a_2(\phi) \rho^2) \times K$ where $a_0(\phi)$, $a_1(\phi)$, and $a_2(\phi)$ are predetermined constants corresponding to the interface member diameter φ, G is a gravitational acceleration, and K is a constant determined in accordance with a type of protective member.

25. The method according to claim 23, wherein the predetermined bi-quadratic function is set such that the calculated flexural rigidity E decreases as the curvature ρ increases.

26. The method according to claim 23, wherein said calculating includes:

specifying in advance, as moduli of a plurality of types of interface members which can be selected as design targets, a relationship between diameters φ of the interface members, torsional rigidities C of the interface members, and weights per unit length of the interface members; and calculating a wiring shape of the target interface member on a basis of the flexural rigidity E calculated by the predetermined bi-quadratic function and the specified torsional rigidity C and specified weight per unit length in accordance with the diameter φ of the target interface member.

27. A computer-readable storage medium storing a program code which causes a computer to implement the interface member wiring design support method defined in claim 23.

28. An interface member wiring design support method of calculating a wiring shape of an interface member on a basis of a plurality of fixing positions and a modulus of deformation of the interface member so as to satisfy the fixing positions, comprising:

calculating, when calculating a wiring shape of a target interface member, forces acting at the plurality of fixing positions due to the interface member; and displaying information associated with the calculated forces, wherein the information displayed includes magnitudes and directions of the calculated forces.

29. A computer-readable storage medium storing a program code which causes a computer to implement the interface member wiring design support method defined in claim 28.

30. An interface member wiring design support method of calculating a wiring shape of an interface member on a basis of a plurality of fixing positions and a modulus of deformation of the interface member so as to satisfy the fixing positions, comprising:

calculating, when calculating a wiring shape of a target interface member, forces acting at the plurality of fixing positions due to the interface member; and displaying information associated with the calculated forces, wherein said calculating includes:

designating, as input item for the plurality of fixing positions with respect to the target interface member, whether the interface member can rotate or cannot rotate in a normal direction at the fixing position; and calculating, when the fixing position is designated as a position at which the interface member can rotate, a force that causes the interface member to rotate in the normal direction as a force applied to the fixing position by the interface member.

31. A computer-readable storage medium storing a program code which causes a computer to implement the interface member wiring design support method defined in claim 30.

32. An interface member wiring design support method of calculating a wiring shape of an interface member on a basis of a plurality of fixing positions and a modulus of deformation of the interface member so as to satisfy the fixing positions, comprising;

calculating, when calculating a wiring shape of a target interface member, forces acting at the plurality of fixing positions due to the interface member; and displaying information associated with the calculated forces, wherein said calculating includes:

calculating a flexural rigidity E of the target interface member using a predetermined bi-quadratic function associated with a curvature ρ of the interface member on the basis of an input interface member diameter φ, and calculating a wiring shape of the target interface member is calculated by using the calculated flexural rigidity E.

33. A computer-readable storage medium storing a program code which causes a computer to implement the interface member wiring design support method defined in claim 32.

34. An interface member wiring design support method of calculating a wiring shape of an interface member on a basis of a plurality of input fixing positions, fixing directions at the fixing positions, and a modulus of deformation of the interface member so as to satisfy the fixing positions, comprising:

designating whether a target interface member can rotate in a normal direction at least at one fixing position of the target interface member; and calculating a shape of the interface member when at least one fixing position is designated as a position at which the interface member can rotate, and calculating a force that causes the interface member to rotate in the normal direction at the designated fixing position.

35. The method according to claim 34, wherein a fixing position that is designated in said designation step as a position at which the interface member can rotate or cannot rotate is an end portion position of the interface member, and position information input as the end portion position is a temporary fixing position which can be moved in calculating a shape of the interface member, and when position information common to a plurality of target interface members is designated as the temporary fixing position at one end portion of the plurality of target interface members, an overall shape of a composite interface member constituted by the plurality of interface members including the common position information as a branch point and a dynamically balancing position of the overall shape to which the branch point should be located are calculated, by recalculating the overall shape every time the common position information is moved by a predetermined amount.

36. The method according to claim 34, wherein a flexural rigidity E of the interface member is calculated by a predetermined bi-quadratic function associated with a curvature $\rho$ of the interface member on a basis of an input interface member diameter $\phi$, and the wiring shape of the interface member is calculated by using the calculated flexural rigidity E.

37. A computer-readable storage medium storing a program code which causes a computer to implement the interface member wiring design support method defined in claim 34.

38. An interface member wiring design support method, comprising:

calculating a wiring shape of an interface member on a basis of at least three fixing positions, fixing directions at the fixing positions, and a modulus of deformation of the interface member so as to satisfy the fixing positions; and displaying the calculated wiring shape of the interface member, wherein said calculating includes, when a target interface member includes a branch point, a shape of an interface member including the branch point, and a dynamically balancing position at which the branch point is to be located owing to the shape.

39. The method according to claim 38, wherein, a flexural rigidity E of the interface member is calculated by a predetermined bi-quadratic function associated with a curvature $\rho$ of the interface member on a basis of an input interface member diameter $\phi$, and the wiring shape of the interface member is calculated by using the calculated flexural rigidity E.

40. A computer-readable storage medium storing a program code which causes a computer to implement the interface member wiring design support method defined in claim 38.

* * * * *

UNITED STATES PATENT AND TRADEMARK OFFICE
CERTIFICATE OF CORRECTION

| | |
|---|---|
| PATENT NO. | : 6,961,683 B2 |
| APPLICATION NO. | : 09/781323 |
| DATED | : November 1, 2005 |
| INVENTOR(S) | : Nobuhiro Kodama et al. |

It is certified that error appears in the above-identified patent and that said Letters Patent is hereby corrected as shown below:

Column 16, Line 32, change "A computer-implemented" to --An--.

Column 16, Line 39, change "wring" to --wiring--.

Column 17, Line 29, change "wring" to --wiring--.

Column 17, Line 36, change "calcultated" to --calculated--.

Column 19, Line 18, change "An" to --A computer-implemented--.

Column 19, Line 58, change "An" to --A computer-implemented--.

Column 20, Line 9, change "An" to --A computer-implemented--.

Column 20, Line 33, change "An" to --A computer-implemented--.

Column 20, Line 37, after "comprising" change ";" to --:--.

Column 20, Line 57, change "An" to --A computer-implemented--.

Column 21, Line 5, after "designation" delete "step".

Column 22, Line 1, change "An" to --A computer-implemented--.

Column 22, Line 18, after "wherein" delete ",".

Signed and Sealed this

Twenty-ninth Day of May, 2007

JON W. DUDAS
*Director of the United States Patent and Trademark Office*